April 9, 1929.  J. DARROCH  1,708,873
CALORIMETRIC BOMB
Filed Dec. 22, 1923
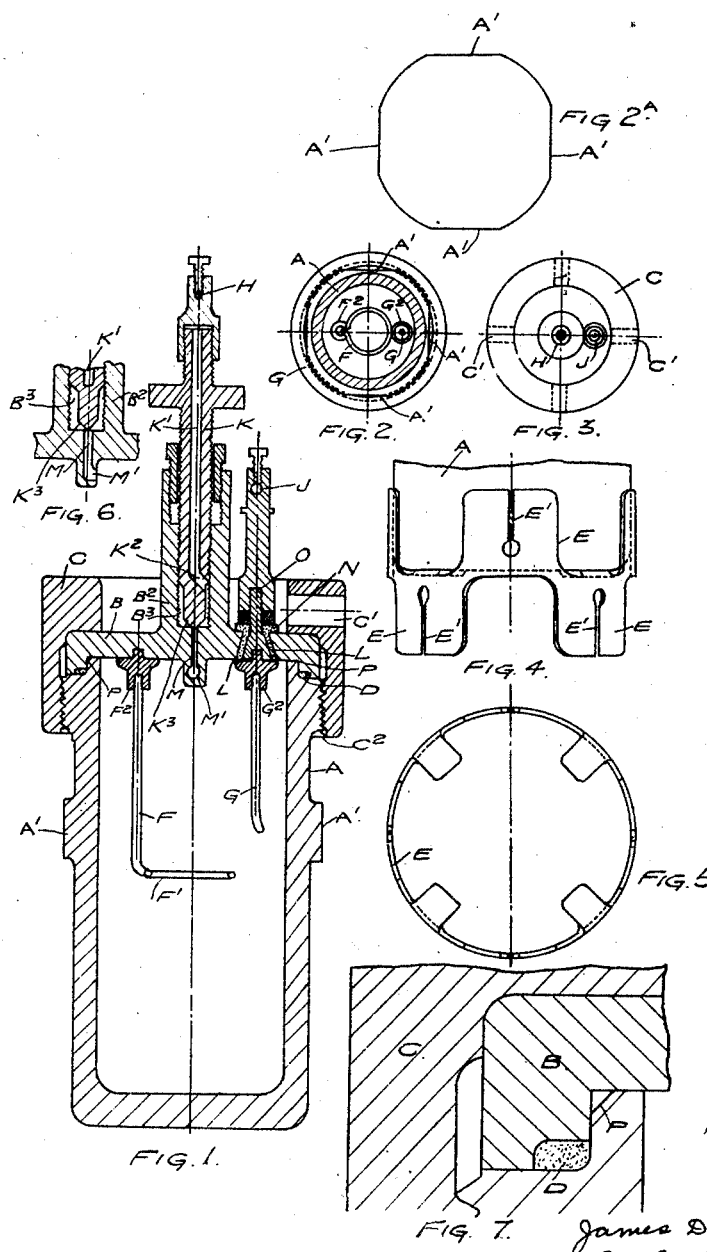

Patented Apr. 9, 1929.

1,708,873

UNITED STATES PATENT OFFICE.

JAMES DARROCH, OF BARRHEAD, NEAR GLASGOW, SCOTLAND.

CALORIMETRIC BOMB.

Application filed December 22, 1923, Serial No. 682,207, and in Great Britain August 13, 1923.

My invention relates to improvements in calorimetric bombs which are used for determining the calorific value of fuels and for the estimation of sulphur in fuels and particularly in fuel oils, and has for its object to construct these of a more simple, cheap and more efficient nature than hitherto, all as hereinafter described with reference to the drawings and pointed out in the claims.

In order that my invention may be properly understood and readily carried into effect, I have hereunto appended one sheet of drawings, of which Figure 1 is a vertical central section of a calorimetric bomb constructed in accordance with my invention.

Figure 2 is a transverse sectional view of the same.

Figure 2$^a$ is an outline of the pseudo octagonal belt.

Figure 3 is a plan of the same.

Figure 4 is a detail elevation of the stand for supporting the bomb.

Figure 5 is a plan of the same.

Figure 6 is a central sectional part view of the cover terminating in a tubulous extension into which the hole through which oxygen is admitted communicates.

Figure 7 is a detail sectional view of a modified construction.

In carrying out my invention, I provide a cylinder A open at one end which open end is suitably machined to receive a cover B suitably recessed on its under face to receive a joint ring D of rubber or other elastic material of round or rounded or other suitable section so that when the cover B is in position the ring D nearly fills the recess thereby providing an absolutely tight joint. The rubber jointing is completely protected from hot gases and is much cheaper and more efficient than the lead washer devices commonly employed. With lead washer devices, the lead forms lead sulphate with the sulphuric acid formed during the combustion so leading to inaccuracies in the estimation of sulphur, whereas the rubber jointing is not affected by the acids formed in the combustion; the joint requiring very little pressure to be applied to render it absolutely tight, makes it possible to use short tommy pins instead of a heavy spanner about 30″ long such as is necessary when a lead joint is used, thus effecting a considerable indirect saving in cost. The cover B is securely held in the cylinder A by the coupling nut C, podger holes C′ being provided on the nut C for tightening up by means of pins. This form of nut is less expensive to make than a hexagonal or octagonal nut for a spanner, or than a nut slotted for same. The holes also facilitate circulation of water over cover B of the bomb, thus increasing efficiency of the apparatus, and by allowing water to drain off when the bomb is lifted from the water container, the drying of the bomb is made much easier. By cutting away the whole or part of one thread on the screwed part of the nut as shown at $C^2$, Figure 1, the engaging of the thread on the nut with that on the cylinder A is greatly facilitated. A′ are four flats formed on the cylinder A, forming a pseudo-octagonal belt. These flats are required to prevent the bomb turning round in the holder when the joint is being tightened. This pseudo-octagonal belt is more easily made and is stronger than any of the existing devices.

In order to ensure that the cover B shall always fall into its proper position the rim of the cylinder is chamfered at P, Figures 1 and 7.

Suspended inside the cylinder A is a rod F, the lower end of which is in the form of a ring F′ for carrying the crucible and which is screwed into a plug $F^2$ which in turn is screwed into the cover B. Another rod G is also suspended inside the cylinder A and is fixed or screwed into a plug $G^2$ which in turn is screwed into the tapered piece O which passes through the cover B and is electrically insulated from the cover B by any suitable material L and N. The upper part of the tapered piece O is screwed into an electrical terminal J.

The plugs $F^2$ and $G^2$ for carrying the electrodes are so formed as to protect from the action of acids the screw threads of the cover B and the tapered piece O, the plug $G^2$ also protecting the insulating material L from the effect of hot gases.

I also provide a head-piece $B^2$ forming part of the cover B in which is screwed a needle-valve K which is reduced in diameter at its lower extremity to form an annular space $B^3$, the point $K^3$ of the valve K having its seat in the bore M in the cover B. The cover has a tubulous extension M′ with which the bore M communicates and is carried at an angle as shown in Figure 6, before entering the cylinder, the lower portion of said bore being made of a larger bore than M in order to reduce the velocity of the gases entering the cylinder A. The hole at M' being turned to the side prevents the entering current of oxygen blowing on the face of the crucible, and being of larger section bore than at M reduces the velocity of entering oxygen so minimizing the liability of currents being set up which might tend to blow some of the fuel out of the crucible. The needle-valve K has a centre bore K' passing into the annular space $B^3$ at $K^2$.

E is the stand which is of one piece of metal the upturned part being slotted and holed as at E' to facilitate slipping the bomb into position on the stand. It will be observed that the stand E is reversible. By its construction, as illustrated in Figures 4 and 5, it facilitates circulation of water under and around the bomb.

Owing to the bomb being absolutely tight more accurate results are obtainable than with other bombs, because the desired excess of oxygen is always present throughout the combustion, thus ensuring complete combustion of the fuel, and the same conditions can always be reproduced. Also sulphur can be more accurately estimated than with other bombs, especially in fuel oils, since (1) there is no reduction in pressure throughout the experiment and (2) no sulphur is lost because of chemical action taking place between the jointing and the sulphuric acid formed during combustion, or through the escape of sulphur gases due to leakage.

Binding screws H and J are provided for the attachment of electric conducting wires.

The operation of the apparatus is as follows:

The sample of fuel to be tested is contained in a shallow crucible of silica or platinum, nickel or other suitable metal, which is supported in a ring formed on one of the electrodes that are attached to the inside of the cover of the bomb. A thin wire, about 0.003 inch diameter stretched between the electrodes is heated by a current of electricity and ignites a fine cotton fuse which in turn ignites the sample of fuel into which it dips or in the case of solid fuels is attached to, or if preferred, the thin ignition wire may itself be allowed to dip into the sample and ignite it directly. The crucible containing the sample having been placed in the ring and the fuse connected to the sample and the ignition wire, the cover is put on the bomb which is then tightened up by means of the nut or collar, and charged with oxygen gas at a pressure of preferably 25 atmospheres, but not less than 20 atmospheres. The bomb is now placed in the calorimeter vessels where it is immersed in a known weight of water, sufficient in quantity to cover the main parts of it, and connection is made with an electric battery by means of suitable insulated leads which are attached to the two terminals of the bomb shown in Figure 1. The water in which the bomb is immersed is kept circulating by means of a stirrer during the experiment and a thermometer of the Beckmann type, capable of being read to 1/1000th° C. by the aid of a lens, dips into the water, and enables the operator to determine accurately the rise in temperature due to the heat evolved from the combustion of the fuels. After taking a series of preliminary readings at intervals of one minute, the operator fires the sample, continuing the readings at one minute intervals during the period when the temperature is rising, and subsequently after temperature begins to fall again, from the data thus obtained the true rise in temperature is calculated. The weight of the sample, the weight of the water in which the bomb is immersed plus the water equivalent of the apparatus, and also the rise in temperature of the water due to the combustion of the fuel being known, the calorific value of the sample can be calculated very exactly. Further, when sulphur or sulphur compounds are burned in a large excess of oxygen which is under high pressure, the sulphur dioxide first formed is converted to sulphuric anhydride, which unites with a small quantity of water placed in the bomb for the purpose of forming sulphuric acid, the amount of which can readily be determined, and so the percentage of combustible sulphur present in the fuel is ascertained with great accuracy if the bomb is gas-tight as those made in accordance with my invention have invariably proven to be.

Claims:

1. A calorimetric bomb comprising a cylinder and a cover, said cover having a downwardly directed tubulous extension the bore of which extends through the cover and terminates short of the free end of the extension the extension having a larger bore communicating with the lower end of the first named bore and directed at an angle thereto.

2. A calorimetric bomb comprising a cylinder, a cover, a nut screwed on the cylinder and bearing on and securing the cover, a ring of elastic packing material between the cylinder and cover, said cylinder and cover being arranged to form an annular space of rectangular section therebetween spaced from their inner and outer sides and in which recess said ring is seated, said ring originally being essentially of less sectional area than the annular recess in which it is seated when the bomb is closed and the cover tightened so that the packing is distorted only to conform to the shape of the annular recess but is not under compression.

3. A calorimetric bomb as claimed in claim 2 in which said cylinder has a pseudo octagonal belt consisting of alternate flats and segments of a circle formed on the cylinder.

4. A calorimetric bomb as claimed in claim 2 in which the nut or collar has holes right through as shown in the drawing for the insertion of pins for screwing up tight and to facilitate the circulation of the water in which the bomb is immersed during operation over the cover.

5. A calorimetric bomb as claimed in claim 2 in which the cover has a tubulous extension on its interior surface into which the hole through which oxygen is admitted connects said tubulous extension in its lower portion being turned to the side and carried horizontally in order to deflect the incoming oxygen away from the sample of fuel and being of a larger bore than the hole referred to for the purpose of causing a reduction in the velocity of the oxygen coming in.

6. In combination with a calorimetric bomb a stand to support the same detachable from the bomb and formed out of metal pierced with holes all as shown in the drawing to facilitate circulation of water beneath the bomb.

7. A calorimetric bomb as claimed in claim 2, the cover of which is provided with two blocks from which electrodes are suspended, said blocks having threaded extensions screwed into the cover and an insulated electrode respectively.

In testimony whereof I affix my signature.

JAMES DARROCH.